United States Patent [19]

Albertson

[11] 3,996,133

[45] Dec. 7, 1976

[54] CALCIUM RECLAMATION PROCESS

[75] Inventor: Orris E. Albertson, Belmont, Calif.

[73] Assignee: Envirotech Corporation, Menlo Park, Calif.

[22] Filed: Apr. 11, 1975

[21] Appl. No.: 567,327

[52] U.S. Cl. .................................. 210/45; 210/6; 210/10; 210/67

[51] Int. Cl.² ......................................... C02B 1/20

[58] Field of Search .............. 210/6, 10, 18, 45, 47, 210/66, 67

[56] References Cited

UNITED STATES PATENTS

| | | | |
|---|---|---|---|
| 2,072,154 | 3/1937 | Butterfield | 210/45 |
| 2,178,586 | 11/1939 | Joachim | 210/45 |
| 3,409,545 | 11/1968 | Albertson | 210/6 |
| 3,546,111 | 12/1970 | Busch | 210/10 |
| 3,623,975 | 11/1971 | Cardinal et al. | 210/6 |

Primary Examiner—Charles N. Hart
Assistant Examiner—Peter A. Hruskoci
Attorney, Agent, or Firm—Robert E. Krebs; Thomas S. MacDonald; Hal J. Bohner

[57] ABSTRACT

A process for reclaiming calcium values from the solid residual of incineration or calcination of calcium-bearing sewage and water sludges includes the following steps: classifying the residuals on the basis of their size and density to form two classified streams, the first of which contains relatively larger sized solid particles and has a relatively decreased concentration of calcium and the second of which contains relatively increased concentration of calcium for reuse; then mixing the particles in the first stream with water to form an aqueous solution containing calcium hydroxide; then clarifying the aqueous solution in a settling zone to form a sediment relatively rich in the insoluble inert solids and a decanted stream which is relatively rich in calcium values.

15 Claims, 2 Drawing Figures

CALCIUM RECLAMATION PROCESS

BACKGROUND OF THE INVENTION

1. Field of the Invention:

This invention relates generally to a process for conserving calcium values for reuse in water and wastewater treatment systems and, more particularly, to an improved process for reclaiming calcium values from the solid residuals produced by the incineration or calcining of calcium-bearing sludges.

2. State of the Art:

In water and wastewater treatment processess, sludges are often produced that contain calcium-bearing compounds in substantial quantities. The calcium-bearing sludges are formed, for example, in tertiary sewage treatment processes wherein phosphorus is removed from wastewater by lime precipitation. In such sludges, the phosphorus values appear as solid compounds which are generally classified as "apatites" by workers in the art and which can be generally designated $Ca_x(PO_4)_y$ where $x$ and $y$ are integers. As another example, calcium-bearing sludges are produced when lime and/or slaked lime are added to raw sewage to serve as a flocculating agent or to water to produce chemical softening; in such cases, the sludges usually include substantial quantities of calcium carbonate. Calcium-bearing sludges are found also in some sugar beet refining operations and in some high-turbidity water treatment systems.

It is well known that the organic materials in such sludges can be disposed of by incineration. Incineration reduces the organic materials to inert ash and concomitantly produces gases and vapors, principally carbon dioxide and steam. It is also well known that sewage sludges can be calcined under controlled conditions to form calcium oxide solids from the calcium carbonate values. In the case of phosphorous-bearing sewage sludges, the apatites which remain after incineration are intimately mixed with the ash and calcium oxide values.

Workers in the field of water and wastewater treatment have long felt a need for an economical system for reclaiming lime values from the solid residuals of incinerated calcium-bearing sludges. If the lime values could be inexpensively reclaimed and recycled in a relatively concentrated form, plant operating costs could be reduced insofar as expenditures for the purchase of lime or limestone are concerned.

According to one previously proposed reclamation technique, the solid residuals of incineration of a calcium-bearing sludge are mixed with water to dissolve the calcium oxide values and to form a sediment of the insoluble components, such as ash. Because calcium oxide is relatively insoluble (its practical solubility is about 1200 mg/l) such a reclamation technique is uneconomical for recovering high percentages of the available calcium. For example, the reclamation of 90–95% of the available calcium values in a sewage treatment plant by means of a dissolving-settling technique would require the handling and recycling of water volumes that equaled about 20–25% of the total plant hydraulic capacity and that, in turn, would require large unit operations and would increase plant capital costs.

Another previously proposed reclamation technique involved a size or density classification of the solid residuals of incineration premised on the fact that calcined lime particles are typically finer and less dense than the solid inert constituents of the incinerated sludge. However, in attempting to recover large fractions (over 70%) of the available calcium values ("accepts") by this classification technique, it was found that size and density overlap caused a progressively increasing proportion of the accepts stream to consist of ash and other undesirable components. In other words, the calcium purity of the accepts stream decreased rapidly as one attempted to recover and recycle larger and larger percentages of the total available calcium. The inclusion of ash and other inerts in the accepts stream increased the cost and decreased the efficiency of the recycle. Furthermore, the efficiency of such a classification system is difficult to predict since the particle size distributions may vary substantially from one geographical area to another.

OBJECTS OF THE INVENTION

A primary object of this invention is to provide an improved process and system for the reclamation of calcium values from the solid residuals produced by the incineration or calcination of calcium-bearing sludges. An important advantage of the invention is that a substantial fraction of the recoverable calcium can be recycled in relatively pure form without the necessity of using large quantities of water.

BRIEF DESCRIPTION OF THE DRAWINGS

Further objects and advantages of the present invention may be readily ascertained by reference to the following description and appended drawings which are offered by way of illustration only and not in limitation of the invention, whose scope is defined by the appended claims and equivalents to the structure, materials and acts recited therein. In the drawings:

DETAILED DESCRIPTION OF THE PREFERRED EMBODIMENT

Figure 1:
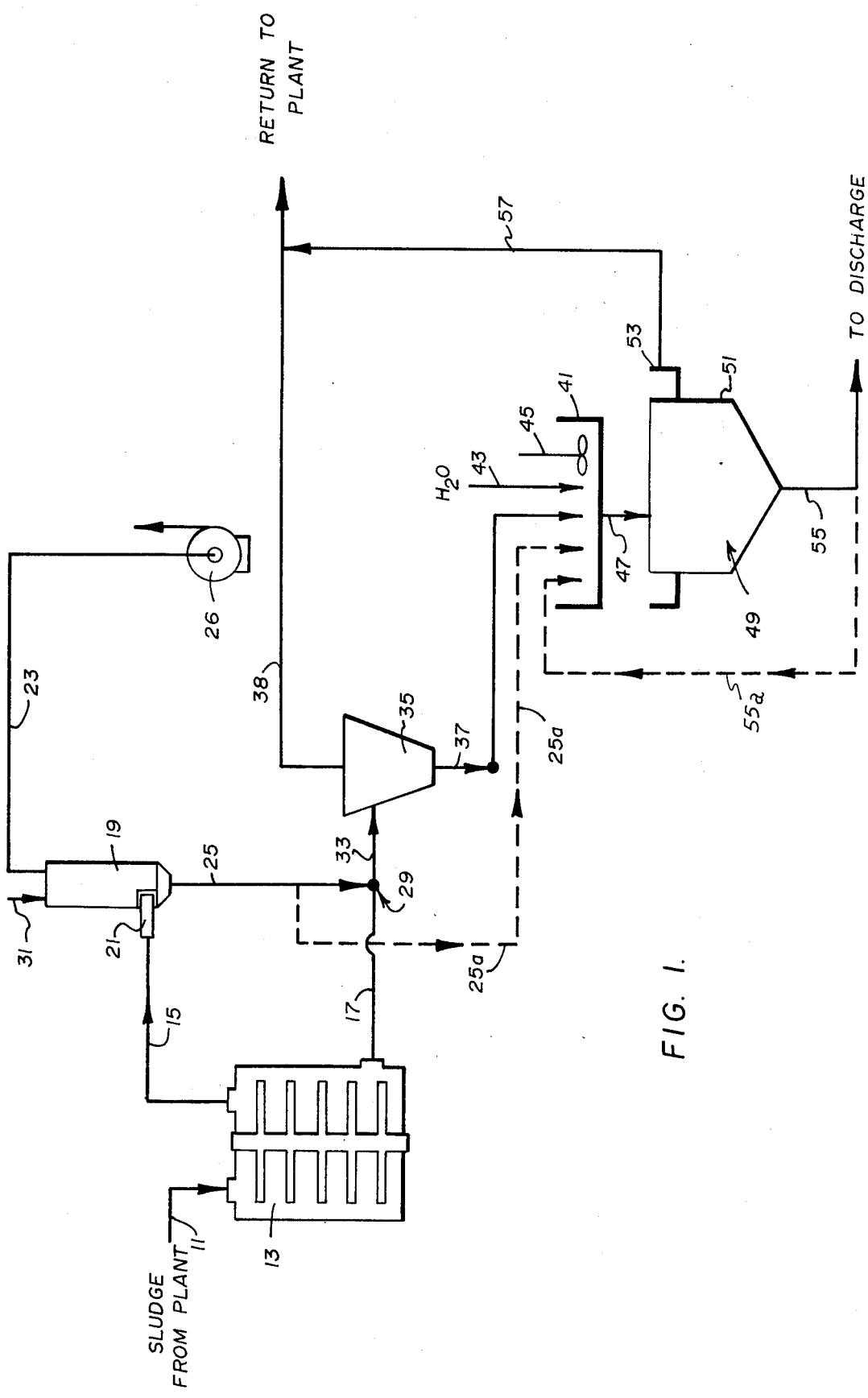
FIG. 1 is a schematic diagram of a system according to the preferred embodiment of the present invention.

Referring now to FIG. 1, a calcium-bearing sludge is carried by a conduit 11 to an incineration device 13 which is illustrated as a conventional multiple hearth furnace but which could also comprise a rotary kiln or a fluidized bed furnace. The gases of incineration (principally nitrogen, oxygen, carbon-dioxide, and steam) are vented from the incineration device via a conduit 15. The residual solids of incineration are carried from the incineration device via a conduit 17. If the sludge feed to the incineration device is from a tertiary sewage treatment process, for example, the sludge will typically contain apatites, organics, inerts, and calcium carbonates. By controlling the combustion of such sludges, the organics can be oxidized to ash and, at the same time, the calcium carbonates can be calcined to produce calcium oxide. Such a process is taught, for example, in U.S. Pat. No. 3,623,975.

Since some of the residual solids of incineration are readily entrained in the exhaust gases, it is usually desirable to interpose a conventional particulate collection device 19 in the vent conduit 15. In the drawings the exhaust gases enter an inlet 21 in the collection device, the cleaned gases are discharged via a conduit 23, and the collected particulates are discharged via a conduit 25. A conventional fan or blower 26 can be provided to enhance the flow of the gases. The particulate collector 19 can be either of the dry type such as a cyclonic collector, or of the wet type such as a venturi scrubber. Where the former type of device is used, the dry collected particles are carried by the conduit 25 to a juncture 29 for addition to the solids stream 17. In the case of a wet scrubbing device, water or other scrubbing liquid is added to the scrubber through a line 31 and the collected wet particulates are carried via a bypass line 25a for processing as will hereinafter be described in detail.

If the incineration device 13 is a conventional fluidized bed furnace, all of the solid products of incineration are carried out of the furnace with the exhaust gases by elutriation and, therefore, the conduit 17 would be omitted. In such an instance, it is mandatory according to the present invention that the particulate recovery device 19 be provided and that it be of the dry type to prevent reversion of CaO to $CaCO_3$, which reaction would occur if water and carbon dioxide gas contacted the calcium oxide solids.

If a dry-type particulate collection device is used with a fluidized bed furnace or if a kiln or multiple hearth incinerator is utilized, the dry residual solids from the incinerated sludge are carried from juncture 29 by a conduit 33 to a classification device 35. A conventional gaseous-type classifier, such a cyclone centrifugal separator, for example, could be used here to classify the particulate solid materials in an air current according to their size and density. Two or more classifiers can be utilized here in series to provide improved separation. It is also contemplated that a conventional hydraulic-type classification unit could be employed to accomplish classification by particle size and density. In the case of hydraulic separation, the dissolved calcium values in the classified streams appear principally as calcium hydroxide.

Referring again to FIG. 1, two conduits 37 and 38 lead from the classifier 35. The first conduit 37 carries the relatively coarser particles (rejects) while the second conduit 38 carries a stream of the finer particulates (accepts). Typically, the accepts stream will comprise particles less than 50 microns in size while the rejects stream includes larger particles. (Normally, the maximum particle size is 250 microns.) It has been found in practice that the accepts stream is in calcium oxide and relatively poorer in ash (i.e., inerts) than the rejects stream and usually includes between 40 and 75 percent of the total available calcium oxide.

The following table sets forth the relative compositions of two typical streams from the classification device 35 in a system having the configuration shown in Figure 1. The table particularly shows totals for the various compounds and percentage of total solids in the stream which they represent.

Although the rejects stream 37 contains a smaller percentage of calcium oxide than the accepts stream 38, it nevertheless includes substantial amounts of calcium in both relative and absolute terms.

In accordance with the present invention, the rejects stream solids are carried, via the conduit 37, to a conventional mixing or solubilizing unit 41 into which a stream of water is added at 43 to dissolve or slake the calcium oxide values to produce calcium hydroxide $Ca(OH)_2$. (If a wet-type particulate recovery unit 19 is utilized, the aforementioned conduit 25a is arranged to discharge directly into the mixing unit 41.)

The mixed solution is conveyed from the mixing unit 41 via a conduit 47 to a conventional sedimentation device 49 which generally includes a large liquid-holding tank 51, an overflow launder 53 for the removal of clarified liquid from the tank, and a bottom discharge 55 for the withdrawal of settled solids. In the tank, the dense insoluble ash and calcium-phosphate components settle rapidly and, accordingly, the underflow stream 55 from the tank includes mostly ash and apatites. The calcium values, on the other hand, are dissolved and are removed in the overflow in the form of calcium hydroxide, $Ca(OH)_2$, and are returned to the treatment plant via a conduit 57.

In an optional modification designated by dashed line 55a in FIG. 1, a fraction of the underflow stream 55 is recycled to the mixing device 41 to further solubilize calcium values that slake slowly and which have settled in tank 51.

Figure 2:
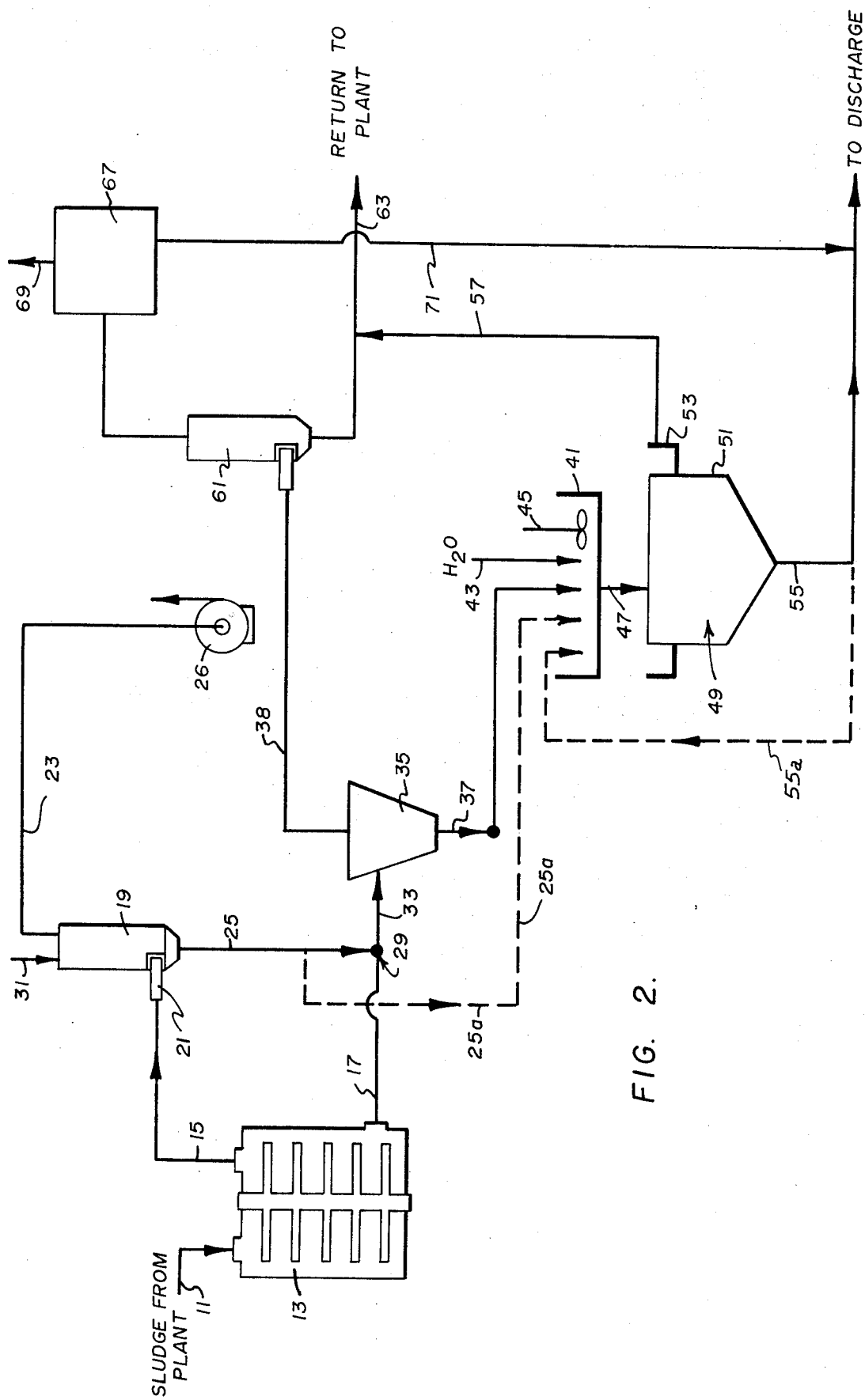
FIG. 2 is a schematic diagram of an alternative embodiment of the system of the invention.

FIG. 2 shows a system which is similar to that in FIG. 1 except for the inclusion of additional components for use in situations where the calcined or incinerated sludge contains very fine inert particles (less than ten microns in diameter) such as clay and the like which are apt to be included in the accepts stream carried by conduit 38. To separate the calcium values from those very fine particles, a second collector 61 is interposed in the conduit 38. The collected calcium values are returned to the plant via a conduit 63 from the collector 61. The gas stream containing the very fine inerts passes from the collector into a conventional baghouse 67 or similar gas cleaning device; cleaned gases pass from the device 67 to the atmosphere by line 69 and collected particles are discharged via line 71. Although FIG. 2 shows line 71 carrying the collected particles from the baghouse 67 to discharge, such particles can instead be conveyed into the mixing tank 41 and thence into the settling device 49 for purposes of recovering additional calcium.

In either the system of FIG. 1 or FIG. 2, a second solubilizing unit (not shown) could be interposed in the "return-to-plant line" to slake the calcium oxide values prior to recycle.

I claim:
1. A process for reclaiming calcium values from a calcium and phosphate-bearing sludge that has been formed by lime dosage of sewage in a sewage treatment plant, or from a calcium sludge containing undesirable inerts derived from the lime treatment of turbid waters

TABLE I

|  | Accepts (Fines) | Rejects (Coarse Particles) | TOTAL (Feed Stream) |
|---|---|---|---|
| CaO | 720 lbs. (71%) | 480 lbs. (41%) | 1200 lbs. (56%) |
| Ash | 180 lbs. (18%) | 420 lbs. (36%) | 600 lbs. (27%) |
| $Ca_x(PO_4)_y$ | 120 lbs. (11%) | 280 lbs. (23%) | 400 lbs. (27%) |
|  | 1020 lbs. (100%) | 1180 lbs. (100%) | 2200 lbs. (100%) | for potable or industrial purposes, said process comprising:

a. calcining the sludge in a first zone to release combustion gases therefrom and to produce a residual mixture of dried solid particulates including calcium-oxide solids, calcium-phosphate solids, and ash;
b. conveying the residual solid mixture from said calcining zone to a second zone;
c. in said second zone, classifying the dried solids in a classification apparatus and forming two streams of classified particles, the first of which contains solid particles which are larger than about 50 microns in diameter, and the second of which contains particles which are smaller than about 50 microns in diameter said second stream including between about 40 and 75 percent of said calcium oxide solids;
d. returning the second stream of classified solid particles to the sewage treatment plant without further classification or separation;
e. conveying the first stream of solid particles to a third zone and there mixing said first stream with water to form an aqueous solution inclusive of dissolved calcium;
f. then conveying said aqueous solution into a fourth zone comprising a generally quiescent body of liquid wherein insoluble solids settle to form a sediment; and
g. removing a decanted stream of the aqueous solution of dissolved calcium from the third zone and thence returning the decanted stream to the sewage treatment plant.

2. The process of claim 1 further including the steps of (a) removing entrained particulates from the released combustion gases and (b) conveying the removed particulates to said second zone for classification together with said residual solids.

3. The process of claim 1 wherein the classification in said second zone is accomplished by hydraulic techniques and at least some of the calcium values in the classified streams appear as calcium hydroxide.

4. The process of claim 1 including the steps of removing sediment from the fourth zone and then conveying a fraction of the sediment to the third zone for mixing.

5. The process of claim 1 further including the steps of (a) scrubbing the released combustion gases to remove entrained particulates therefrom in an aqueous stream and (b) conveying the aqueous stream to said third zone for mixing therein.

6. The process of claim 1 wherein the classification in said second zone is accomplished by gaseous techniques and the calcium values in the classified streams appear as calcium oxide.

7. A process for reclaiming calcium values from a calcium-bearing sludge that has been formed by lime dosage of sewage in a treatment plant, said process comprising:

a. burning the sludge in a first zone and releasing gases of combustion to carry solid particulates, including calcium-oxide solids and ash, from said first zone by elutriation;
b. separating said elutriated particulates from said gases and then conveying said particulates to a second zone;
c. in a said second zone, classifying the particulates in a classification apparatus to form two classified streams, the first of which contains solid particles which are larger than about 50 microns in diameter, and the second of which contains particles which are smaller than about 50 microns in diameter said second stream including between about 40 and 75 percent of said calcium oxide solids;
d. returning the second stream of classified solid particles to the sewage treatment plant without further classification or separation;
e. conveying the first stream of solid particles to a third zone and there mixing the stream with water to form an aqueous solution inclusive of calcium hydroxide;
f. then conveying said aqueous solution into a fourth zone comprising a generally quiescent body of liquid wherein insoluble solids settle to form a sediment; and
g. removing a decanted stream of the aqueous solution from the third zone and thence returning the decanted stream to the sewage treatment plant.

8. The process of claim 7 wherein said particulates are separated from said combustion gases in a dry gaseous-type particulate collection device.

9. The process of claim 7 wherein said aqueous solution from said fourth zone is conjoined with said second classified stream for return to the sewage treatment plant.

10. The process of claim 7 including the steps of removing sediment from the fourth zone and then returning at least a portion of such sediment to said third zone for mixing.

11. A process for reclaiming calcium values from the solid residuals of incineration or calcination of a calcium-bearing sludge comprising the steps of:

a. classifying the solid residuals on the basis of their size and density in a classification means to form two classified streams, the first of which contains solid particles which are larger than about 50 microns in diameter, and the second of which contains particles which are smaller than about 50 microns in diameter said second stream including between about 40 and 75 per cent of said calcium values;
b. transmitting the second classified stream without further classification or separation to reuse in forming said sludge;
c. in a mixing zone, mixing the particles in the first stream with water to form an aqueous solution containing calcium hydroxide;
d. clarifying the aqueous solution in a settling zone to form a sediment relatively rich in the insoluble inert solids; and
e. removing a decanted stream from the settling zone, said decanted stream being relatively rich in calcium values, for reuse in forming said sludge.

12. A process according to claim 11 wherein said classification is accomplished by hydraulic means and at least some of the calcium values in the two classified streams appear as calcium hydroxide.

13. A process according to claim 11 wherein said classification is accomplished by gaseous means and the calcium values in the two classified streams appear as calcium oxide.

14. A process according to claim 11 further including the steps of removing the sediment from the settling zone and then conveying at least a portion of the sediment to the mixing zone.

15. A process according to claim 13 wherein the second stream is conveyed to a solubilizing means to slake the calcium oxide values to calcium hydroxide.

* * * * *